(12) United States Patent
Chen et al.

(10) Patent No.: US 12,389,840 B2
(45) Date of Patent: Aug. 19, 2025

(54) FLUID DYNAMIC RAIN-MAKING APPARATUS

(71) Applicants: Shih-Hsiung Chen, Tainan (TW); Shu-Hsia Chang Chien, Kaohsiung (TW)

(72) Inventors: Shih-Hsiung Chen, Tainan (TW); Shu-Hsia Chang Chien, Kaohsiung (TW)

( * ) Notice: Subject to any disclaimer, the term of this patent is extended or adjusted under 35 U.S.C. 154(b) by 415 days.

(21) Appl. No.: 18/094,523

(22) Filed: Jan. 9, 2023

(65) Prior Publication Data

US 2023/0217869 A1 Jul. 13, 2023

(30) Foreign Application Priority Data

Jan. 10, 2022 (TW) .................................. 111200296

(51) Int. Cl.
*A01G 15/00* (2006.01)
(52) U.S. Cl.
CPC .................................... *A01G 15/00* (2013.01)
(58) Field of Classification Search
CPC ....................................................... A01G 15/00
USPC ......................................... 239/2.1, 14.1, 171
See application file for complete search history.

(56) References Cited

U.S. PATENT DOCUMENTS

| | | | | |
|---|---|---|---|---|
| 3,126,155 A | * | 3/1964 | Lohse | A01G 15/00 239/14.1 |
| 3,429,507 A | * | 2/1969 | Jones | A01G 15/00 239/2.1 |
| 3,645,446 A | * | 2/1972 | Patten | F25C 3/04 239/14.1 |
| 7,131,600 B2 | * | 11/2006 | Stocker | B64D 1/18 239/171 |

* cited by examiner

*Primary Examiner* — Steven J Ganey
(74) *Attorney, Agent, or Firm* — Chun-Ming Shih; HDLS IPR SERVICES

(57) ABSTRACT

A fluid dynamic rain-making apparatus includes a first tubular member (10) and a thermal conductor (20). The first tubular member (10) includes a fluid channel having a first opening (12) and a second opening (13). An axial cross section of the fluid channel (11) decreases from the first opening (12) toward the second opening (13). The thermal conductor (20) includes a second tubular member (21) attached to the second opening (13) of the first tubular member (10) and heat sinks (22) circumferentially arranged on an outer surface thereof. A fluid (A) enters the fluid channel (11) from the first opening (11) and forms a cooled fluid (A1) through flowing through the fluid channel (11) for cooling the second tubular member (21), thus the heat sinks (22) are cooler than the external fluid (A). Accordingly, moist air is cooled to reach the dew point to form water drop for rainfall.

10 Claims, 8 Drawing Sheets

FLUID DYNAMIC RAIN-MAKING APPARATUS

TECHNICAL FIELD

The present disclosure relates to a rain-making apparatus, and in particular to a fluid dynamic rain-making apparatus.

DESCRIPTION OF RELATED ART

Water resource is one of the essential resources for living, and in general, the main water sources are stored in reservoirs after collection from rainwater, and some of the water sources are obtained from desalination of sea water or other methods. With increasing water demand for agricultural, industrial, and domestic use, reduction of water storage capacity of reservoirs due to sediment accumulation over a long period of time, unstable rainfall, or insufficient rainfall due to high-temperature waste gas from industrial plants, water source acquisition becomes more difficult, such that rain making process is required.

The related-art rain making method is to deliver catalyst (moisture absorbing powder, such as sodium chloride and silver iodide) into the atmosphere at high altitude via the method of canon or fireworks to change the cloud property, size, and distribution, thereby generating water drops for rain. However, such type of rain making method is applicable to small scope of area, and the raining area cannot be precisely controlled. Moreover, it also requires additional cost to purchase and use catalyst for the generation of rain. Accordingly, there is a need to increase and control the scope of area of rain making while reducing the use of catalyst at the same time.

In view of the above, the inventor seeks to overcome the aforementioned drawbacks associated with the current technology and aims to provide an effective solution through extensive researches along with utilization of academic principles and knowledge.

SUMMARY OF PRESENT DISCLOSURE

A primary objective of the present disclosure is to cool moist air to the dew point to allow moisture to condense into rain drop to achieve the raining effect.

To achieve the aforementioned objective, the present disclosure provides a fluid dynamic rain-making apparatus including a first tubular member having a fluid channel, two ends of the fluid channel having a first opening and a second opening formed thereon respectively, and an axial cross section of the fluid channel configured to decrease along a direction from the first opening toward the second opening; and a thermal conductor having a second tubular member and a plurality of heat sinks circumferentially arranged on an outer surface of the second tubular member, the second tubular member attached to the second opening of the first tubular member. A fluid enters the fluid channel from the first opening and forms a cooled fluid after acceleratedly flowing through the fluid channel, the cooled fluid cools the second tubular member while flowing through the second tubular member, thereby allowing a temperature of each one of the heat sinks to be lower than a temperature of the fluid at an external of the thermal conductor.

The present disclosure is able to achieve the following technical effects. By arranging the heat sinks parallel to the flowing direction of the fluid, the external fluid is facilitated to flow through the thermal conductor. As the third tubular member is tapered, the fluid is able to flow smoothly at the fluid dynamic rain-making apparatus. With the two side wings respectively arranged at the outer surface of the second tubular member of the thermal conductor, a sufficient lifting force may be generated to support the weight of the fluid dynamic rain-making apparatus. With the tail vane arranged at the top of the third tubular member, the fluid dynamic rain-making apparatus may be aligned with the flowing direction of the fluid, such that deviation and wobbling of the apparatus may be prevented.

DETAILED DESCRIPTION

The technical contents of the present disclosure will become apparent with the detailed description of embodiments and the accompanied drawings as follows. However, it shall be noted that the accompanied drawings for illustrative purposes only such that they shall not be used to restrict the scope of the present disclosure.

Figure 1:
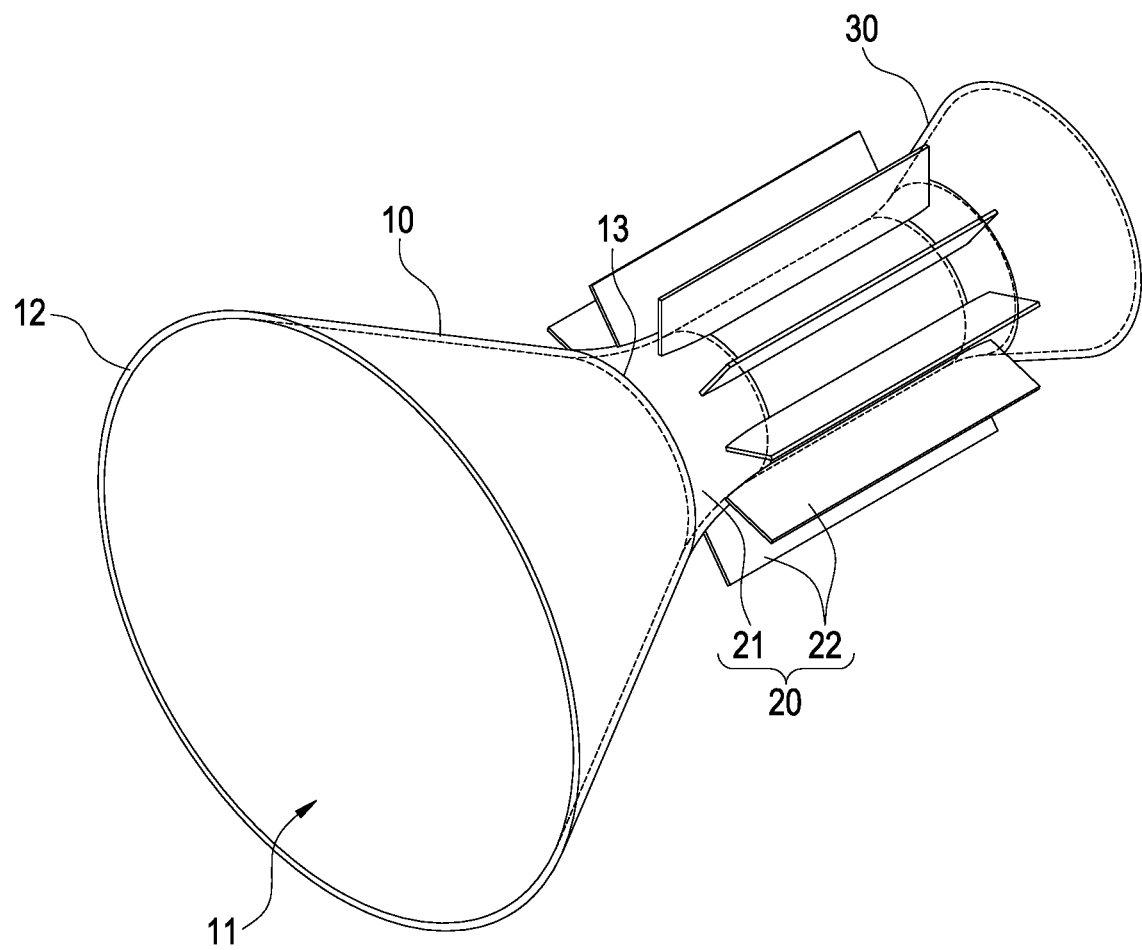
FIG. 1 is a perspective appearance view of the first exemplary embodiment of the present disclosure.
Figure 2:
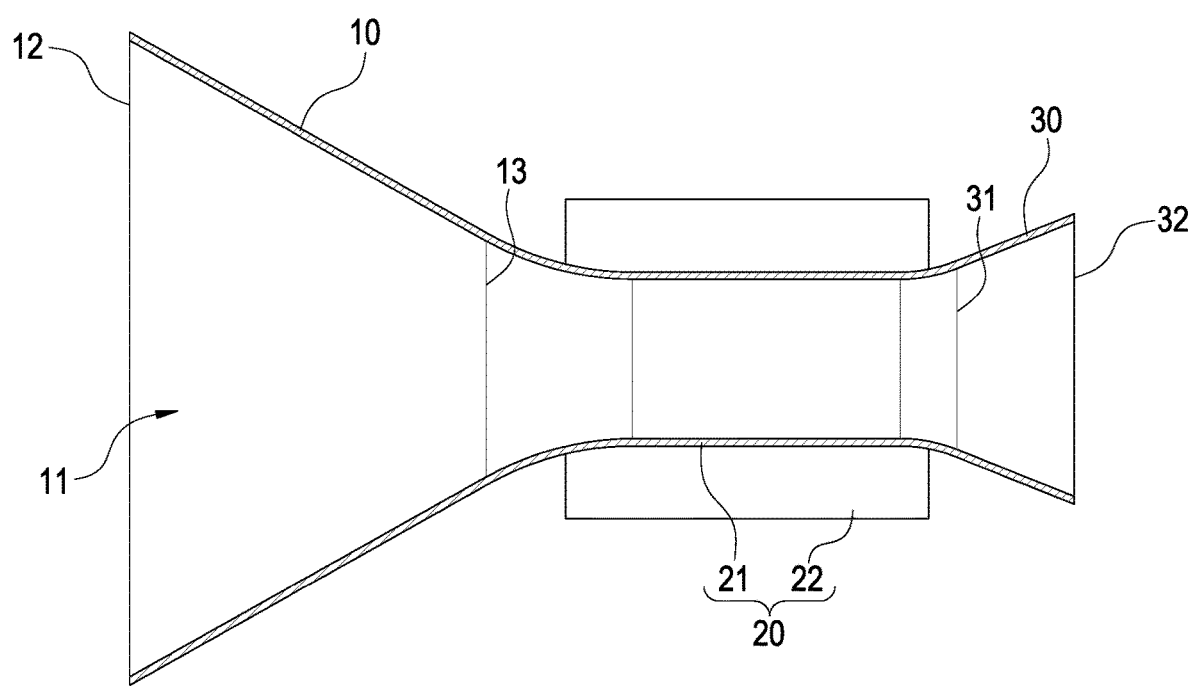
FIG. 2 is a cross sectional side view of the first exemplary embodiment of the present disclosure.

The present disclosure provides a fluid dynamic rain-making apparatus that may be used at a high altitude where clouds are formed. As shown in FIG. 1 and FIG. 2, a first exemplary embodiment of the present disclosure includes a first tubular member 10 and a thermal conductor 20.

Figure 3:
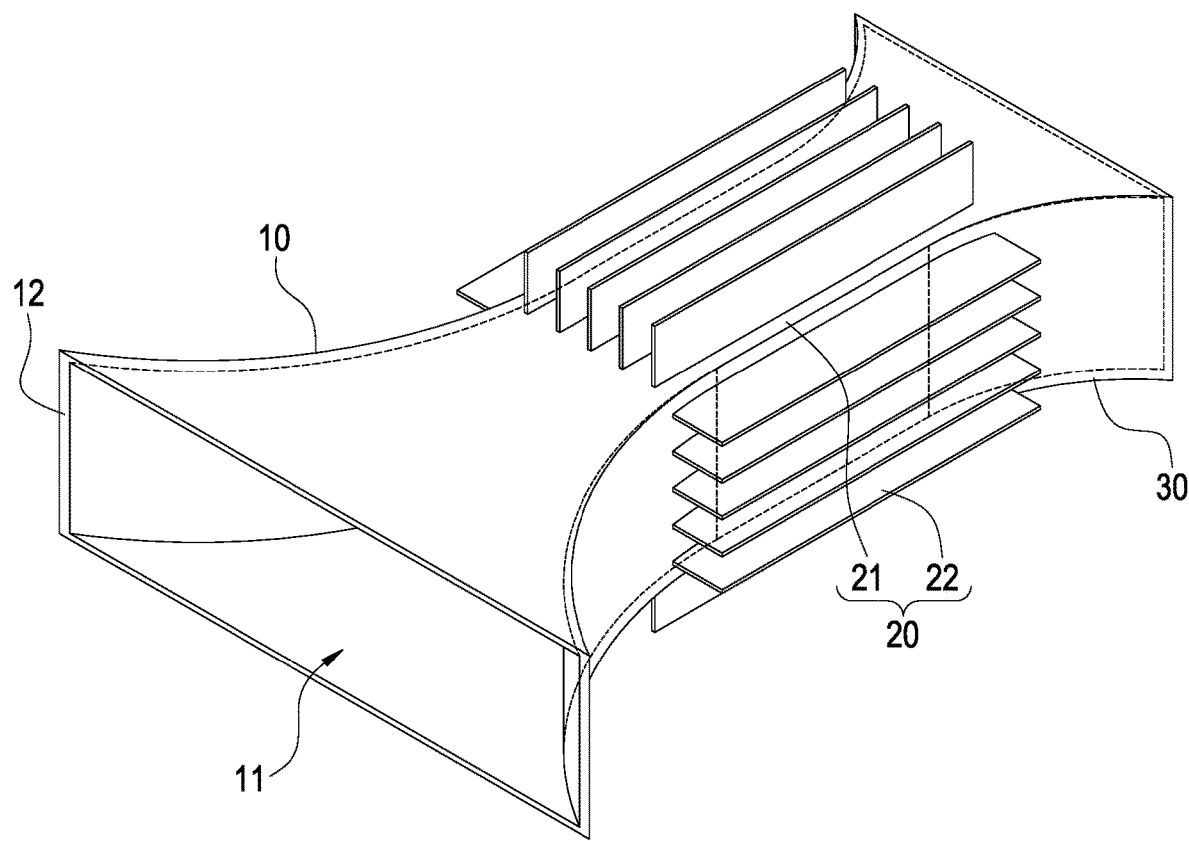
FIG. 3 is a perspective appearance view of the second exemplary embodiment of the present disclosure.
Figure 4:
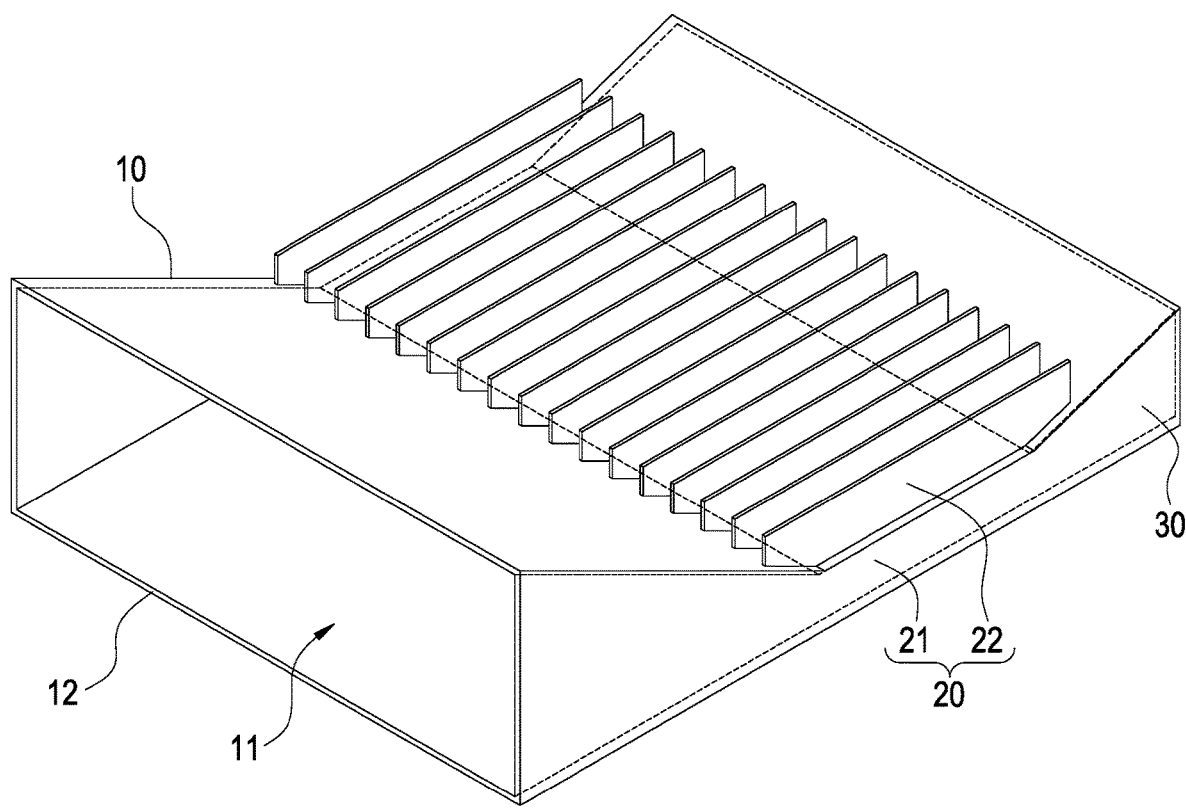
FIG. 4 is a perspective appearance view of the third exemplary embodiment of the present disclosure.

The first tubular member 10 may be a plastic tube, a metal tube, a glass fiber tube, or carbon fiber tube, and here is not intended to be limiting. In some embodiments, the first tubular member 10 is a metal tube such that it has a stronger structural strength and is able to reduce impact on its structure due to high and low temperature changes. The first tubular member 10 includes a fluid channel 11, and two ends of the fluid channel 11 includes a first opening 12 and a second opening 13 formed thereon respectively. In this exemplary embodiment, the axial cross section (the sectional area) of fluid channel 11 decreases along a direction from the first opening 12 toward the second opening 13, and the radial cross section of the fluid channel 11 is of a circular shape. However, the present disclosure is not limited to such shape only. Please refer to FIG. 3 and FIG. 4, showing the second and third exemplary embodiments of the present disclosure respectively. The radial cross section of the fluid channel 11 may also be of a rectangular shape having either equivalent widths or equivalent lengths.

Please refer to FIG. 1 and FIG. 2. The thermal conductor 20 includes a second tubular member 21 and a plurality of heat sinks 22 circumferentially arranged on an outer surface of the second tubular member 21. In this exemplary embodiment, the second tubular member 21 is a metal tube, and the plurality of heat sinks 22 are metal slabs, such that the thermal conductor 20 is able to achieve desirable thermal conduction effect. The shape of the radial cross section of the second tubular member 21 is identical to the shape of the radial cross section of the second opening 13. In addition, the second tubular member 21 is seamlessly attached to the second opening 13 of the first tubular member 10. Each one of the heat sinks 22 is arranged parallel to the flowing direction of the fluid A to facilitate the flow and contact of the fluid A at the external of the thermal conductor 20.

Figure 5:
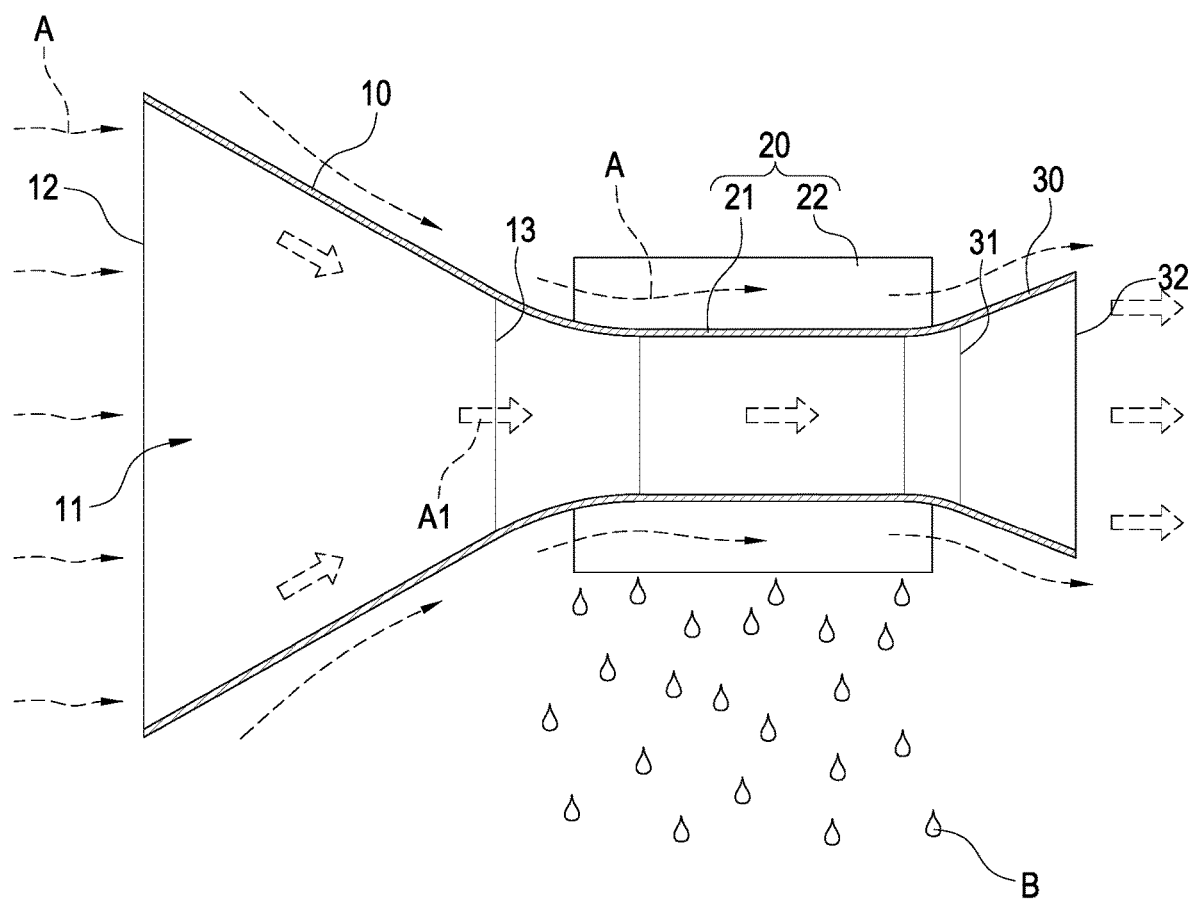
FIG. 5 is a cross sectional side view of the first exemplary embodiment of the present disclosure under its state of use.

As shown in FIG. 5, the fluid A enters the internal of the fluid channel 11 from the first opening 12, and forms a cooled fluid A1 after flowing through the fluid channel 11 at an accelerated velocity. In addition, since the area of the first opening 12 is greater than the area of the second opening 13, the velocity of the fluid A at the second opening 13 is greater than its velocity at the first opening 12. According to the Bernoulli's principle, when the velocity of a fluid increases, its pressure and temperature decrease at the same time. Consequently, the temperature of the fluid A at the second opening 13 is lower than its temperature at the first opening 12. As a result, the cooled fluid A1 is able to cool the second tubular member 21 while flowing through the second tubular member 21, thereby allowing the thermal conductor 20 to be lower than the temperature of the fluid A at the external. Consequently, when the fluid A at the external flows through and contacts the thermal conductor 20, it is cooled to reach the dew point and is condensed to form water drops B, thereby achieving the raining effect. In view of the above, the rain-making effect may be achieved continuously without the use of any catalyst.

To be more specific, please refer to FIG. 1 and FIG. 2 again. The fluid dynamic rain-making apparatus of the present disclosure further includes a third tubular member 30. The third tubular member 30 may be a plastic tube, a metal tube, a glass fiber tube or carbon fiber tube, here is not intended to be limiting. In some embodiments, the third tubular member 30 is a metal tube such that it has a stronger structural strength and is able to prevent any impact on its structure due to high and low temperature changes. The shape of the radial cross section of the third tubular member 30 is identical to the shape of the radial cross section of the second tubular member 21. Two ends of the third tubular member 30 includes a third opening 31 and a fourth opening 32. The axial cross section (sectional area) of the third tubular member 30 increases along a direction from the third opening 31 toward the fourth opening 32, and the third opening 31 is attached to another end of the second tubular member 21 in a manner that the third opening 31 is in end-butted connection to the second tubular member 21 and provides lateral enclosure for the fluid A, thereby allowing the fluid A to flow into the third opening 31 of the third tubular member 30 via the second tubular member 21 and to exit from the fourth opening 32. In addition, since the area of the third opening 31 is smaller than the area of the fourth opening 32, such that the cooled fluid A1 inside the tubular member is able to flow out smoothly.

Figure 6:
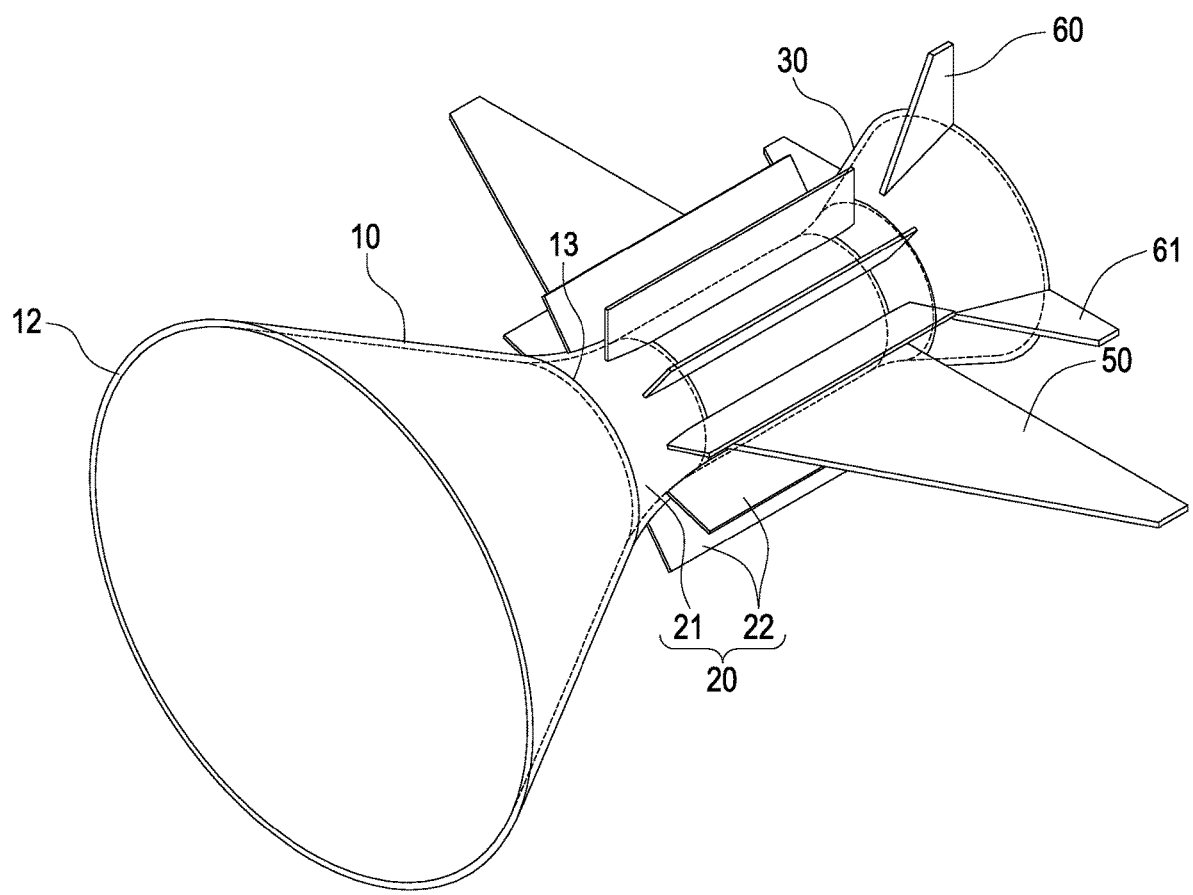
FIG. 6 is a perspective appearance view of the fourth exemplary embodiment of the present disclosure.

Furthermore, please refer to FIG. 6, showing a fourth exemplary embodiment of the present disclosure. The main difference between this exemplary embodiment and the other previously mentioned exemplary embodiments relies in that it further includes a pair of side wings 50, a tail vane 60 and a pair of horizontal tail vanes 61. The two side wings 50 are arranged at the outer surface of the second tubular member 21 of the thermal conductor 20 respectively. The side wings 50 are arranged symmetrically (on the left and right sides) and parallelly to each other, such that a sufficient lifting force is generated to support the weight of the fluid dynamic rain-making apparatus of the present disclosure. The tail vane 60 is arranged at the top of the third tubular member 30, and it is also arranged parallel to the flowing direction of the fluid and perpendicular to the second tubular member 21. The pair of horizontal tail vanes 61 are arranged on left and right sides of the third tube 30 respectively, and the pair of horizontal tail vanes 61 are also arranged parallel to each other and perpendicular to the tail vane 60 respectively. With the tail vane 60 and the horizontal tail vanes 61, the fluid dynamic rain-making apparatus of the present disclosure may be aligned with the flowing direction of the fluid, such that deviation and wobbling of the apparatus may be prevented.

Figure 7:
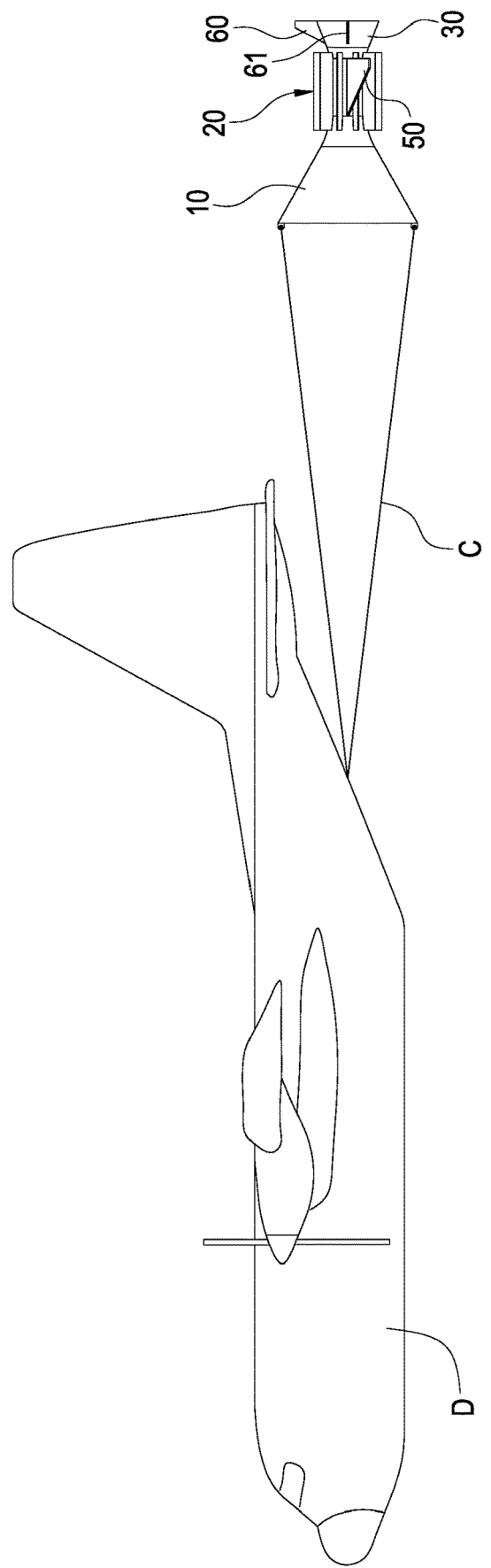
FIG. 7 is a side view of the fourth exemplary embodiment of the present disclosure for its first application method.

Please refer to FIG. 7, showing a first application method of the fluid dynamic rain-making apparatus of the present disclosure. A plurality of cables C are installed at the first opening 12 of the first tubular member 10, and another end of each one of the cables C is attached to an aircraft D. Accordingly, the aircraft D may drag the fluid dynamic rain-making apparatus of the present disclosure at high altitude, and the altitude and range of the fluid dynamic rain-making apparatus of the present disclosure may be effectively controlled to limit the scope of rainfall within the desired area.

Figure 8:
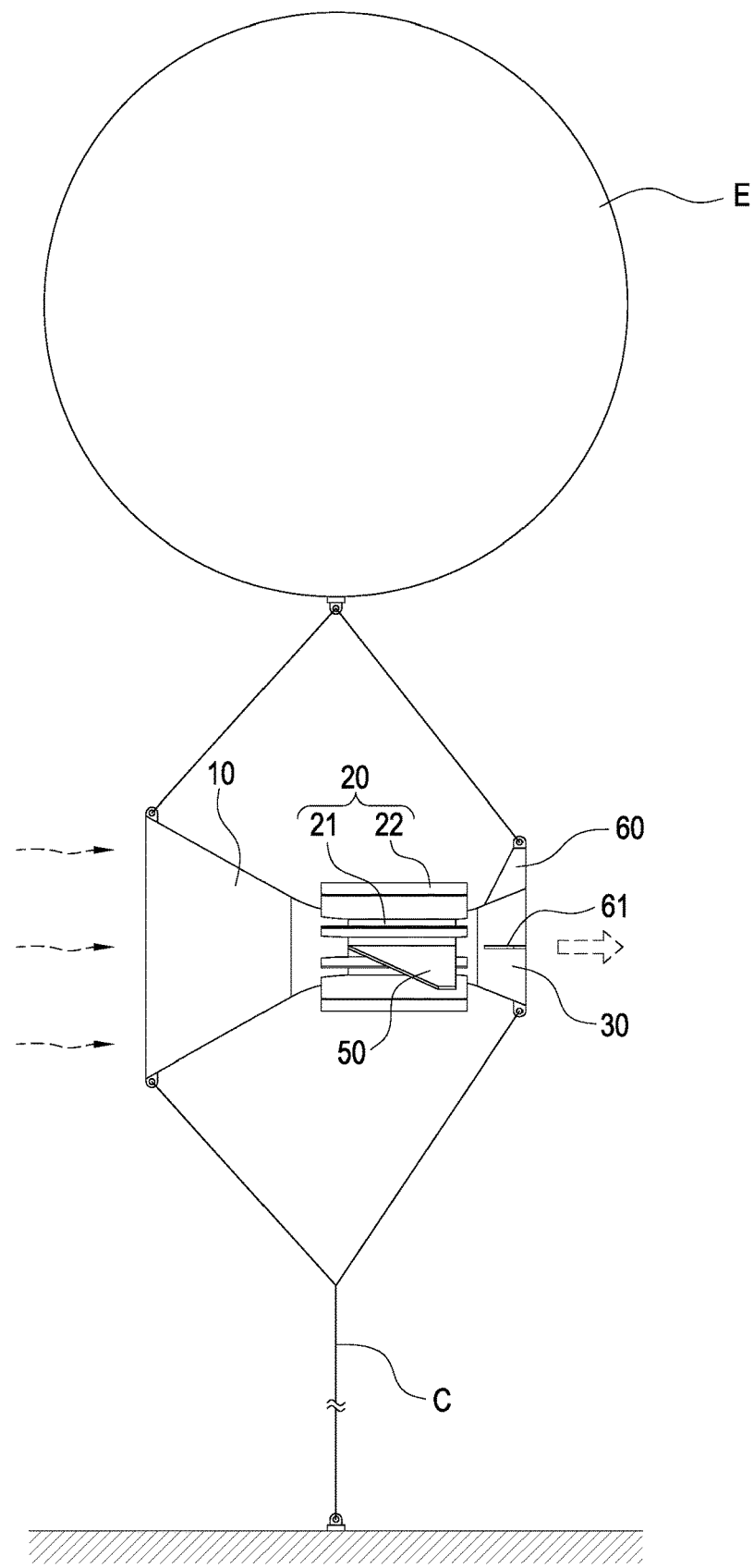
FIG. 8 is a side view of the fourth exemplary embodiment of the present disclosure for its second application method.

Please further refer to FIG. 8, showing a second application method of the fluid dynamic rain-making apparatus of the present disclosure. A plurality of cables C are installed at the top and bottom of the first opening 12 and the fourth opening 32 respectively. Other ends of the cables C at the top of the first opening 12 and the fourth opening 32 are connected to a balloon E, and other ends of the cables C at the bottom of the first opening 12 and the second opening 32 are attached to the ground. Accordingly, when the balloon E is lifted to a high altitude, the fluid dynamic rain-making apparatus of the present disclosure is also carried to a high altitude at the same time. In addition, as the cables C attached to the ground may pull the fluid dynamic rain-making apparatus, the fluid dynamic rain-making apparatus is suspended stably at a high altitude to facilitate the formation of rainfall.

It shall be understood that the present disclosure may have other types of embodiments, and a person with ordinary skills in the art of the technical field of the present disclosure may make various changes and modifications corresponding to the present disclosure without deviating the principle and substance of the present disclosure; however, such corresponding changes and modification shall be considered to be within the claimed scope of the present disclosure.

What is claimed is:

1. A fluid dynamic rain-making apparatus, comprising:
   a first tubular member (10), comprising a fluid channel (11), the fluid channel (11) comprising a first opening (12) and a second opening (13) defined on two ends thereof respectively, and an axial cross section of the fluid channel (11) decreasing along a direction from the first opening (12) toward the second opening (13); and
   a thermal conductor (20), comprising a second tubular member (21) and a plurality of heat sinks (22) circumferentially arranged on an outer surface of the second tubular member (21), the second tubular member (21) attached to the second opening (13) of the first tubular member (10);
   wherein a fluid (A) enters the fluid channel (11) from the first opening (12) to be a cooled fluid (A1) after acceleratedly flowing through the fluid channel (11), and the cooled fluid (A1) cools the second tubular member (21) while flowing through the second tubular member (21) to make a temperature of each one of the heat sinks (22) be lower than a temperature of the fluid (A) at an external of the thermal conductor (20).

2. The fluid dynamic rain-making apparatus according to claim 1, wherein each one of the heat sinks (22) is arranged parallel to a flowing direction of the fluid (A).

3. The fluid dynamic rain-making apparatus according to claim 1, wherein a shape of a radial cross section of the second tubular member (21) is identical to a shape of a radial cross section of the first tubular member (10).

4. The fluid dynamic rain-making apparatus according to claim 3, wherein a shape of a radial cross section of the fluid channel (11) is a circular shape.

5. The fluid dynamic rain-making apparatus according to claim 3, wherein a shape of a radial cross section of the fluid channel (11) is a rectangular shape.

6. The fluid dynamic rain-making apparatus according to claim 1, further comprising a third tubular member (30), the third tubular member (30) comprising a third opening (31) and a fourth opening (32) defined on two ends thereof, and the third opening (31) attached to the second tubular member (21).

7. The fluid dynamic rain-making apparatus according to claim 6, wherein a shape of a radial cross section of the third tubular member (30) is identical to a shape of a radial cross section of the second tubular member (21), and an axial cross section of the third tubular member (30) increases along a direction from the third opening (31) toward the fourth opening (32).

8. The fluid dynamic rain-making apparatus according to claim 6, further comprising a tail vane (60) arranged on the third tubular member (30), and the tail vane (60) arranged parallel to a flowing direction of the fluid (A) and perpendicular to the second tubular member (21).

9. The fluid dynamic rain-making apparatus according to claim 8, further comprising a pair of horizontal tail vanes (61) arranged on two sides of the third tubular member (30) respectively, and the pair of horizontal tail vanes (61) arranged parallel to each other and perpendicular to the tail vane (60) respectively.

10. The fluid dynamic rain-making apparatus according to claim 1, further comprising a pair of side wings (50) arranged symmetrically and parallelly to each other on the outer surface of the second tubular member (21).

* * * * *